US010728177B2

(12) United States Patent
Varghese et al.

(10) Patent No.: US 10,728,177 B2
(45) Date of Patent: Jul. 28, 2020

(54) FIBER CHANNEL FORWARDER ROUTING SYSTEM

(71) Applicant: Dell Products L.P., Round Rock, TX (US)

(72) Inventors: Vibin Varghese, Tamil Nadu (IN); Ramesh Kumar Subbiah, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 80 days.

(21) Appl. No.: 16/042,480

(22) Filed: Jul. 23, 2018

(65) Prior Publication Data

US 2020/0028802 A1 Jan. 23, 2020

(51) Int. Cl.
*H04L 12/931* (2013.01)
*H04L 12/935* (2013.01)
*H04L 12/937* (2013.01)

(52) U.S. Cl.
CPC .......... *H04L 49/357* (2013.01); *H04L 49/253* (2013.01); *H04L 49/3009* (2013.01)

(58) Field of Classification Search
CPC .. H04L 49/357; H04L 49/3009; H04L 49/253
See application file for complete search history.

(56) References Cited

U.S. PATENT DOCUMENTS

| 2007/0097950 | A1* | 5/2007 | Boyd | G06F 13/4022 |
| | | | | 370/351 |
| 2008/0025322 | A1* | 1/2008 | Tadimeti | H04L 41/08 |
| | | | | 370/400 |
| 2011/0110241 | A1* | 5/2011 | Atkinson | H04L 41/22 |
| | | | | 370/242 |
| 2016/0007102 | A1* | 1/2016 | Raza | H04Q 11/0005 |
| | | | | 398/45 |

* cited by examiner

*Primary Examiner* — Curtis A Alia
(74) *Attorney, Agent, or Firm* — Haynes and Boone, LLP

(57) ABSTRACT

A Fibre Channel Forwarder (FCF) routing system includes an FCF device that is coupled to a Fibre Channel (FC) networking device through a first FCF device port, coupled to a source device through a second FCF device port, and coupled to a first destination device through a third FCF device port. The FCF device receives first traffic from the source device at the second FCF device port. Using a first FCF device routing table, the FCF device determines that a destination device identifier included in the first traffic corresponds with the first destination device. In response determining the destination device identifier included in the first traffic corresponds with the first destination device, the FCF device routes the first traffic through the third FCF device port to the first destination device without forwarding the first traffic through the first FCF device port to the FC networking device.

20 Claims, 16 Drawing Sheets

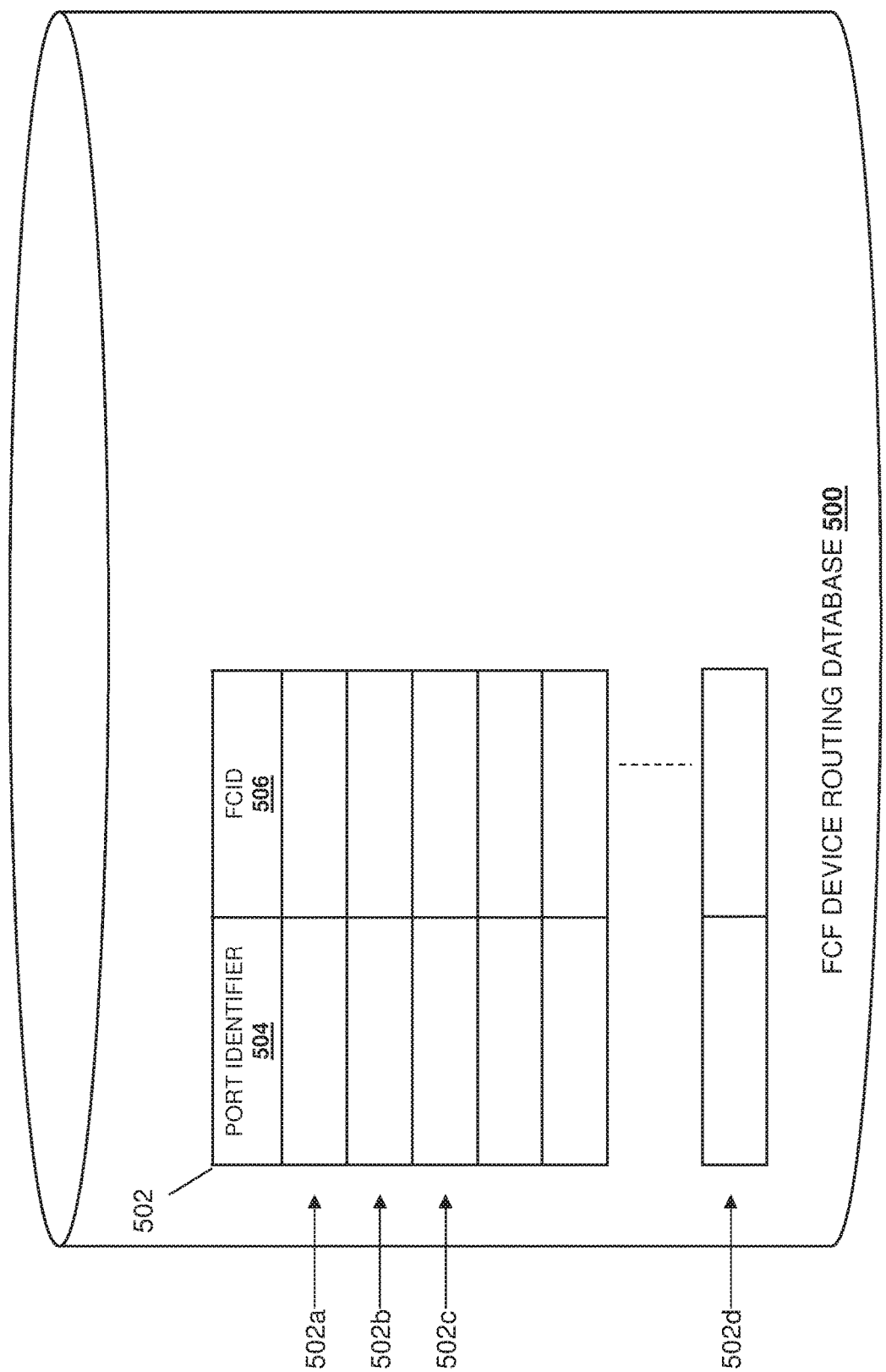

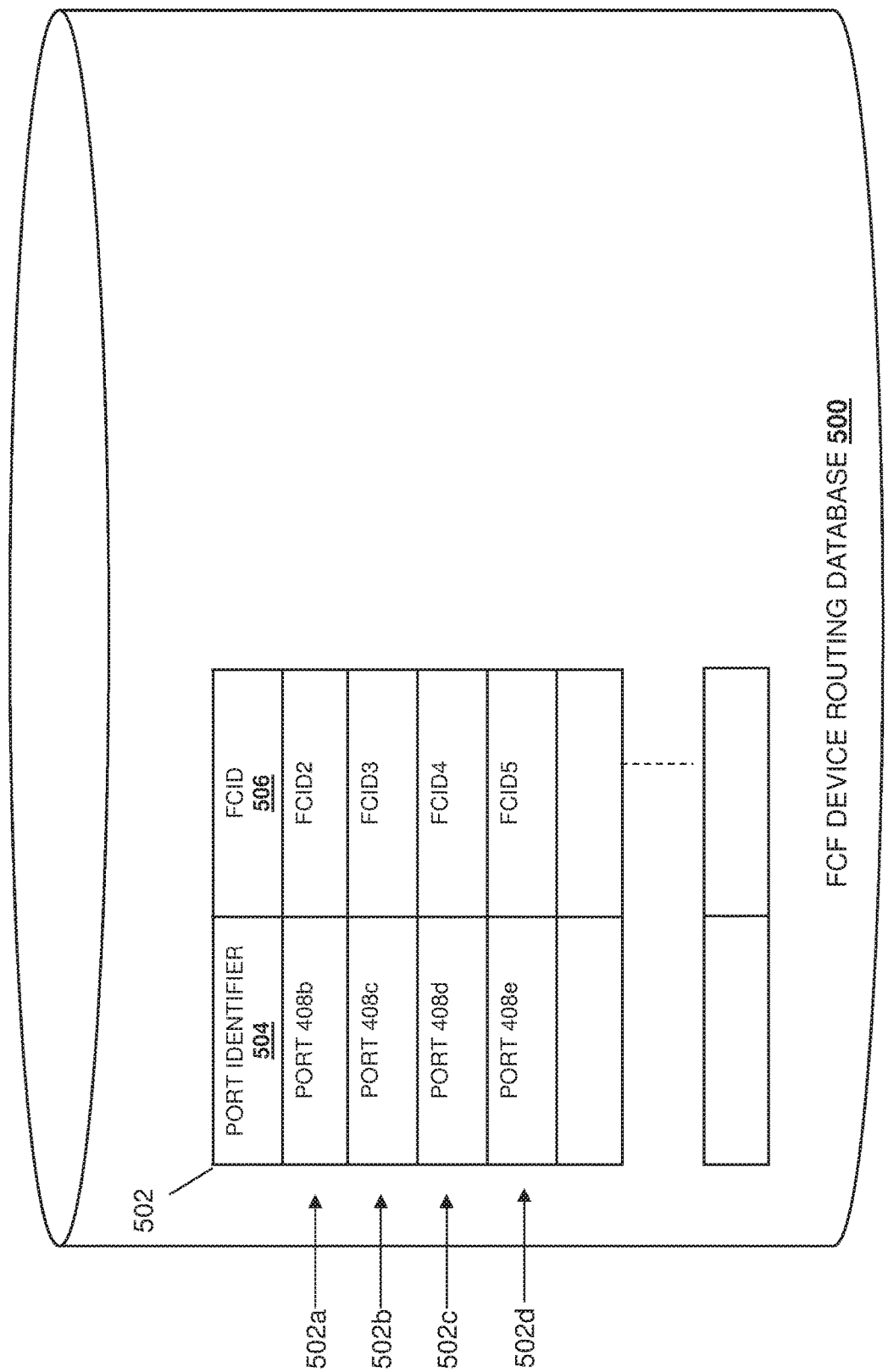

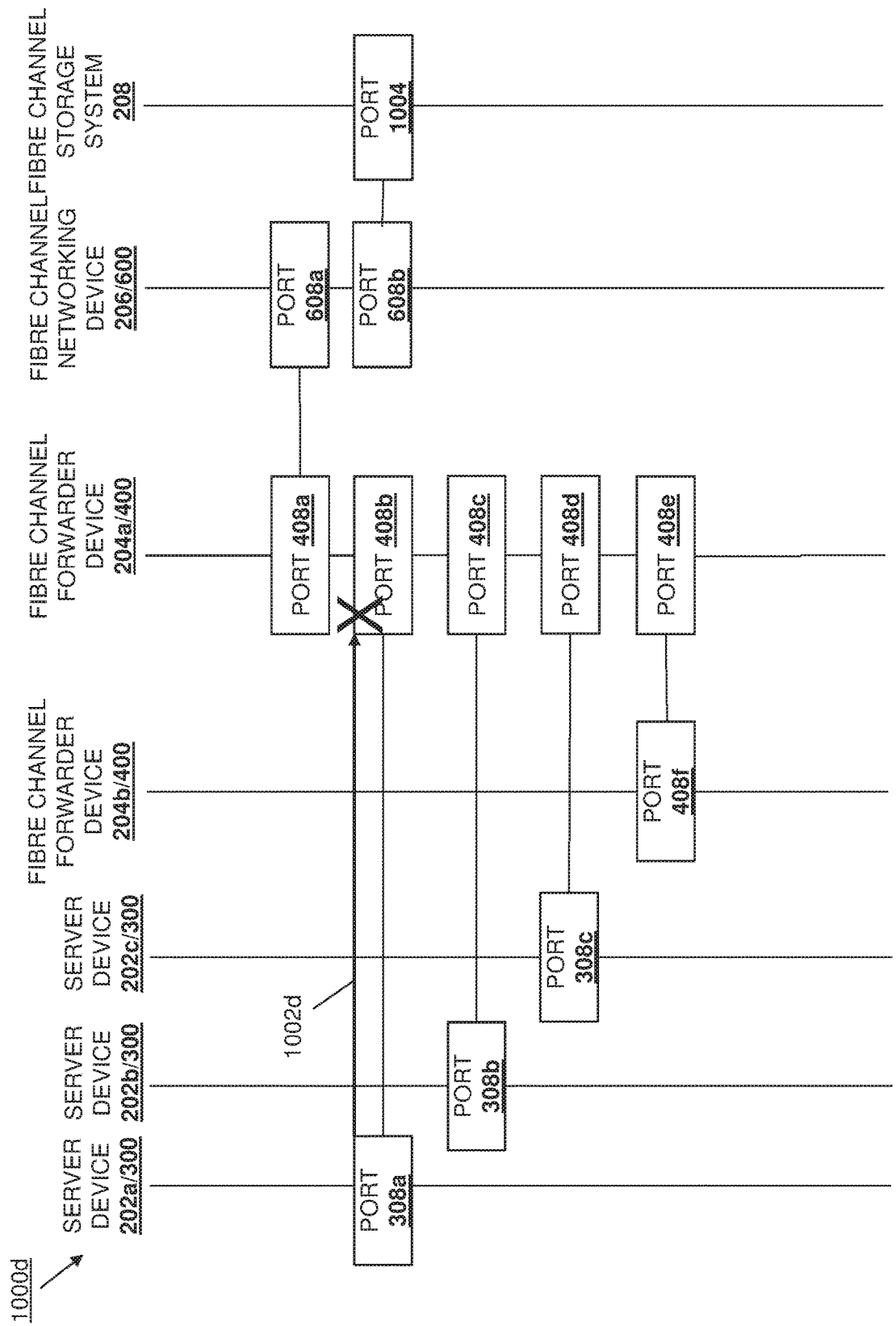

FIBER CHANNEL FORWARDER ROUTING SYSTEM

BACKGROUND

The present disclosure relates generally to information handling systems, and more particularly to Fibre Channel Forwarder (FCF) traffic routing by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems provide a Fibre Channel (FC) Storage Area Network (SAN) for the storage of data. In such systems, an FC switch may be utilized to couple the FC SAN to servers via a Fibre Channel Forwarder (FCF) that performs FC over Ethernet (FCoE)-to-FC protocol conversions on Ethernet communications sent from the servers to the FC SAN, as well as FC-to-FCoE protocol conversions on FC communications sent from the FC SAN to the servers. Such FCFs allow for servers that communicate via the Ethernet protocol to utilize FC SANs that communicate via the FC protocol. However, the conventional functionality of such FCFs raises a number of issues.

For example, servers in such systems may utilize a Converged Network Adapter (CNA) to communicate with an N_Port ID Virtualization (NPIV) Proxy Gateway (NPG) in the FCF in order to provide login communication for logging into the FC SAN, with the FCF converting those login communications and the NPG providing them to the FC switch in order to log the server into the FC SAN. After logging servers into the FC SAN, the FCF may forward traffic from those servers to the FC switch. The FC switch may then route the traffic to the FC SAN using Fibre Channel identifiers (FCIDs) that are included in the traffic and that were assigned to the node ports (N_Ports) of the servers and the FCF device during fabric login. In conventional systems, all traffic received at the FCF is required to be routed by the FC switch. Thus, when a server provides traffic to the FCF and the destination of that traffic is also connected to the FCF, the traffic is first forwarded to the FC switch to perform the routing as discussed above to provide the traffic back to the FCF, which then provides the traffic to the destination device. This creates a "traffic tromboning" effect which causes a number of issues such as inefficient traffic paths that introduce latency with the traffic, congestion between the FCF and the FC switch, and other undesirable traffic characteristics.

Accordingly, it would be desirable to provide an improved FCF routing system.

SUMMARY

According to one embodiment, an Information Handling System (IHS) includes a plurality of ports; a processing system that is coupled to the plurality of ports; and a memory system that is coupled to the processing system and that includes instructions that, when executed by the processing system, cause the processing system to provide an N_Port ID Virtualization (NPIV) Proxy Gateway (NPG) engine that is configured to: receive first traffic from a source device that is connected to a first port of the plurality of ports; determine, using a first Fibre Channel Forwarder (FCF) device routing table, that a destination device identifier included in the first traffic corresponds with a first destination device; and route, in response determining the destination device identifier included in the first traffic corresponds with the first destination device, the first traffic through a second port of the plurality of ports to the first destination device without forwarding the first traffic through a third port of the plurality of ports to a Fibre Channel (FC) networking device.

BRIEF DESCRIPTION OF THE DRAWINGS

FIG. 5A is a schematic view illustrating an embodiment of an FCF device routing database in the FCF device of FIG. 2.

FIG. 9A is a schematic view illustrating an embodiment of information being provided in the FCF device routing database of FIG. 5A during the method of FIG. 8.

FIG. 10D is a diagram illustrating an embodiment of the FCF device routing during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
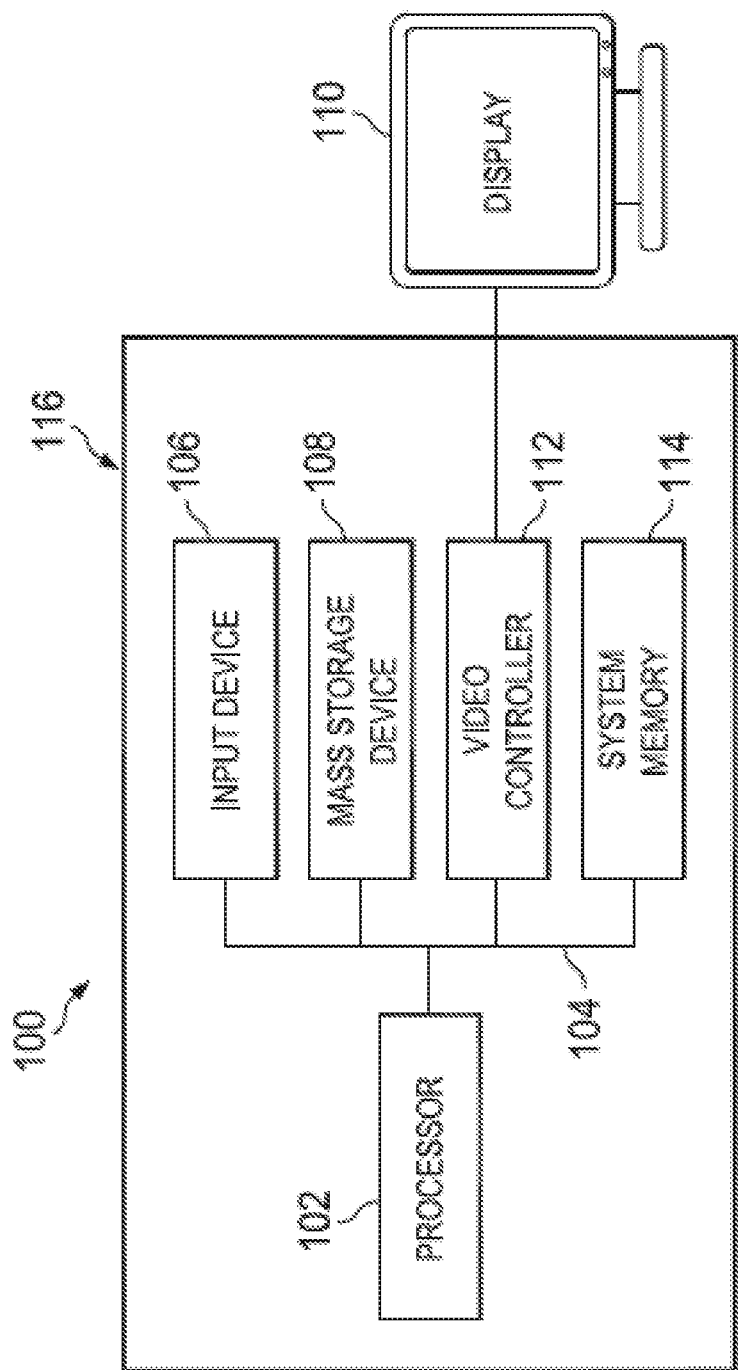
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
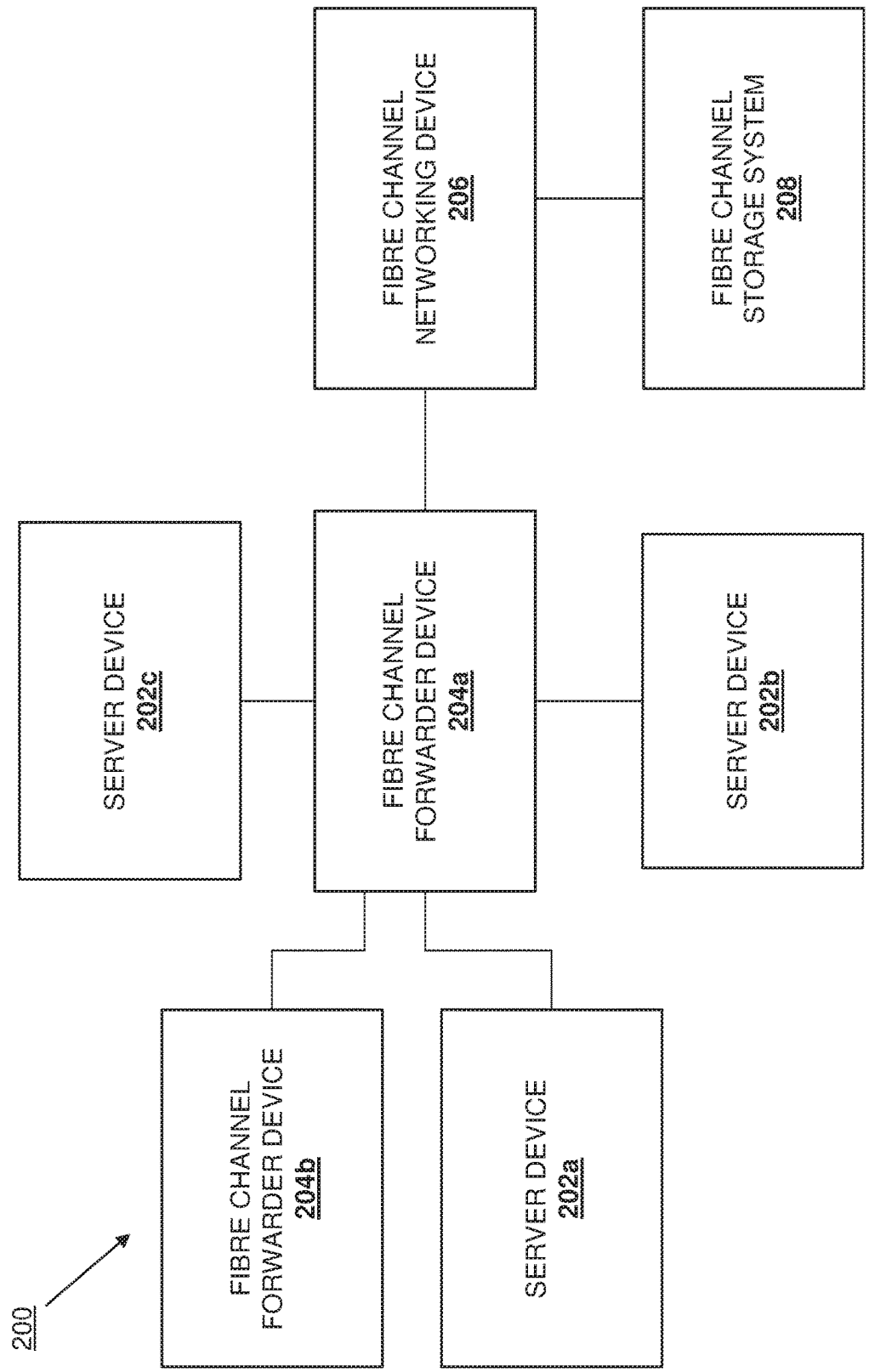
FIG. 2 is a schematic view illustrating an embodiment of a Fibre Channel Forwarder (FCF) routing system.

Referring now to FIG. 2, an embodiment of a Fibre Channel Forwarder (FCF) routing system 200 is illustrated. In the illustrated embodiment, the FCF routing system 200 includes a one or more server devices (e.g., a server device 202a, a server device 202b, and up to a server device 202c illustrated in FIG. 2) that may be the IHS 100 discussed above with reference to FIG. 1 and/or that may include some or all of the components of the IHS 100. For example, the server devices 202a-202c may be one or more servers in a server rack or server chassis, and one of skill in the art in possession of the present disclosure will recognize that any number of servers may be provided in the FCF routing system 200 and may operate similarly to the server devices discussed below. In the illustrated embodiment, the server devices 202a-202c are coupled to a Fibre Channel Forwarder (FCF) device 204a that may be the IHS 100 discussed above with reference to FIG. 1 and/or that may include some or all of the components of the IHS 100. For example, the FCF device 204a may be provided by a switch or other networking device that is configured to receive Ethernet communications from the server device 202a, convert those Ethernet communications to Fibre Chanel (FC) communications for forwarding to an FC Storage Area Network (SAN), receive FC communications from the FC SAN, convert those FC communications to Ethernet communications for forwarding to the server devices 202a-202c, and/or perform other FCF device functionality know in the art.

In the illustrated embodiment, the FCF device 204a is coupled to an FC networking device 206 that may be the IHS 100 discussed above with reference to FIG. 1 and/or that may include some or all of the components of the IHS 100. For example, the FC networking device 206 may be provided by a FC switch that is configured to receive FC communications (e.g., initialed by the server device 202a) from the FCF device 204a, log the server devices 202a-202c into an FC SAN, subsequently receive FC communications (e.g., initialed by the server devices 202a-202c) from the FCF device 204a, transmit those FC communications to the FC SAN to allow the server devices 202a-202c to communicate with the FC SAN, and perform a variety of other FC networking device functionality that would be apparent to one of skill in the art in possession of the present disclosure. In the illustrated embodiment, the FC networking device 206 is coupled to an FC storage system 208 that may be the IHS 100 discussed above with reference to FIG. 1 and/or that may include some or all of the components of the IHS 100. For example, the FC storage system 208 may be provided by a FC SAN that is configured to receive FC communications from the server devices 202a-202c through the FC networking device 206 and the FCF device 204a, send FC communications to the server devices 202a-202c through the FC networking device 206 and the FCF device 204a, and/or perform a variety of other FC storage system functionality that would be apparent to one of skill in the art in possession of the present disclosure. While a specific FCF routing system 200 is illustrated and described below, one of skill in the art in possession of the present disclosure will recognize that the teachings of the present disclosure will be beneficial for a variety of FC systems that would be apparent to one of skill in the art in possession of the present disclosure and, as such, a wide variety of modifications to the number, types, and orientation of devices in the FCF routing system 200 will fall within the scope of the present disclosure as well. For example, as illustrated in FIG. 2, the FCF device 204a may be coupled to another FCF device 204b.

Figure 3:
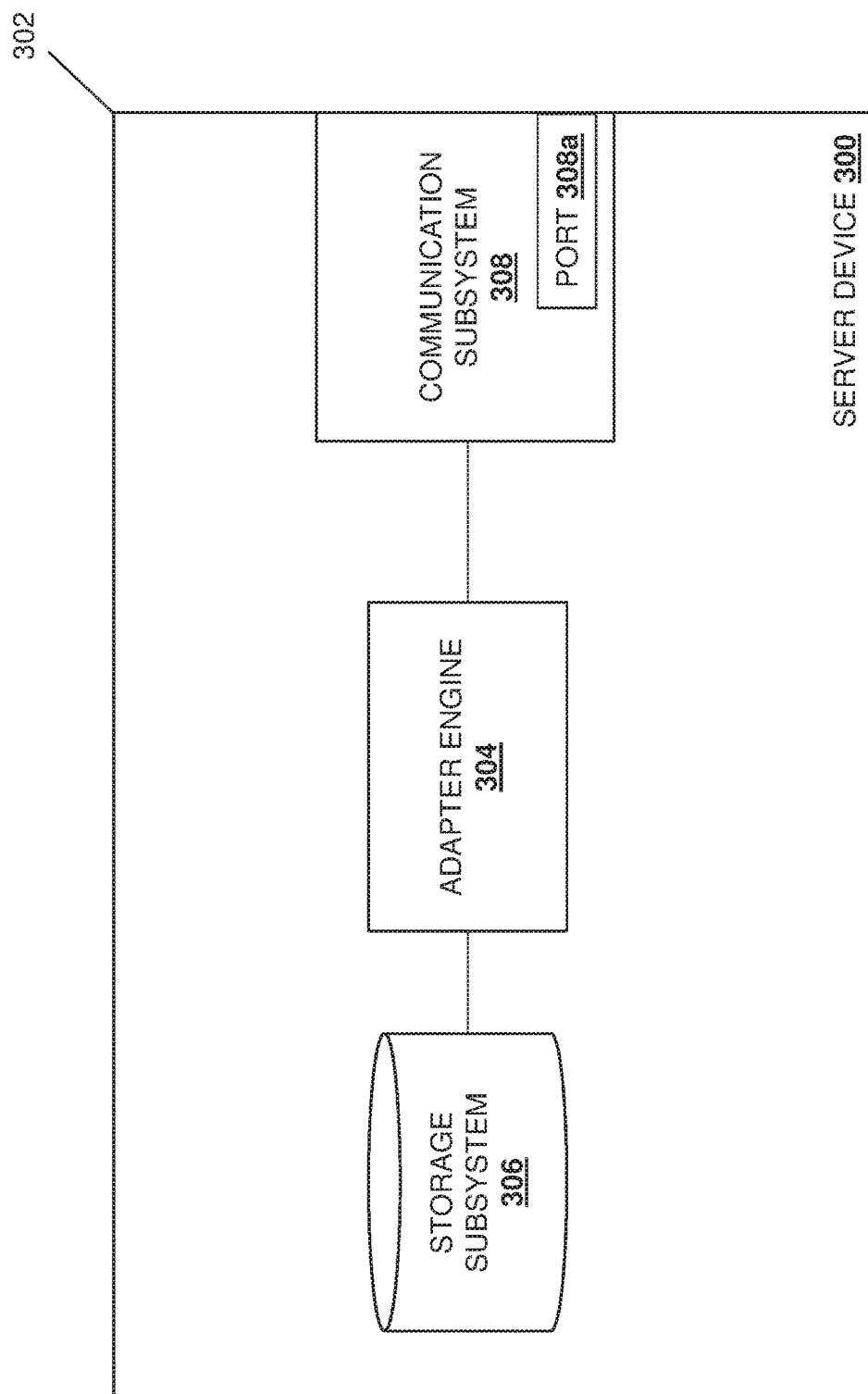
FIG. 3 is a schematic view illustrating an embodiment of a server device in the FCF routing system of FIG. 2.

Referring now to FIG. 3, an embodiment of a server device 300 is illustrated that may be the server devices 202a, 202b, and/or 202c discussed above with reference to FIG. 2. As such, the server device 300 may be the IHS 100 discussed above with reference to FIG. 1 and/or may include some or all of the components of the IHS 100, and in specific examples may be one or more servers in a server rack or server chassis. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an adapter engine 304 that is configured to perform the functions of the adapter engines and server devices discussed below.

The chassis 302 may also house a storage system (not illustrated, but which may include the storage device 108 discussed above with reference to FIG. 1) that is coupled to the adapter engine 304 (e.g., via a coupling between the storage system and the processing system) and that may include a storage subsystem 306 that is configured to store the data utilized as discussed below. However, in some embodiments the storage subsystem 306 may be omitted. The chassis 302 may also house a communication subsystem 308 that is coupled to the adapter engine 304 (e.g., via a coupling between the communication subsystem 308 and the processing system) and that may include a Network Interface Controller (NIC), a wireless communication devices, one or more ports (e.g., a port 308a), and/or other communication components that would be apparent to one of skill in the art in possession of the present disclosure. Furthermore, in some embodiments, components of the adapter engine 304 and/or the communication subsystem 308 may be provided by a Converged Network Adapter (CNA) that performs the functionality of the adapter engines and/or server devices discussed below. However, in other embodiments, the adapter engine 304 and/or communication subsystem 308 may be utilized to provide other types of adapters (e.g., Host Bus Adapters (HBAs)) while remaining within the scope of the present disclosure. While a specific server device 300 has been described, one of skill in the art in possession of the present disclosure will recognize that the server device 300 may include a variety of other components that perform conventional server device functionality, as well as the functionality described below, while remaining within the scope of the present disclosure.

Figure 4:
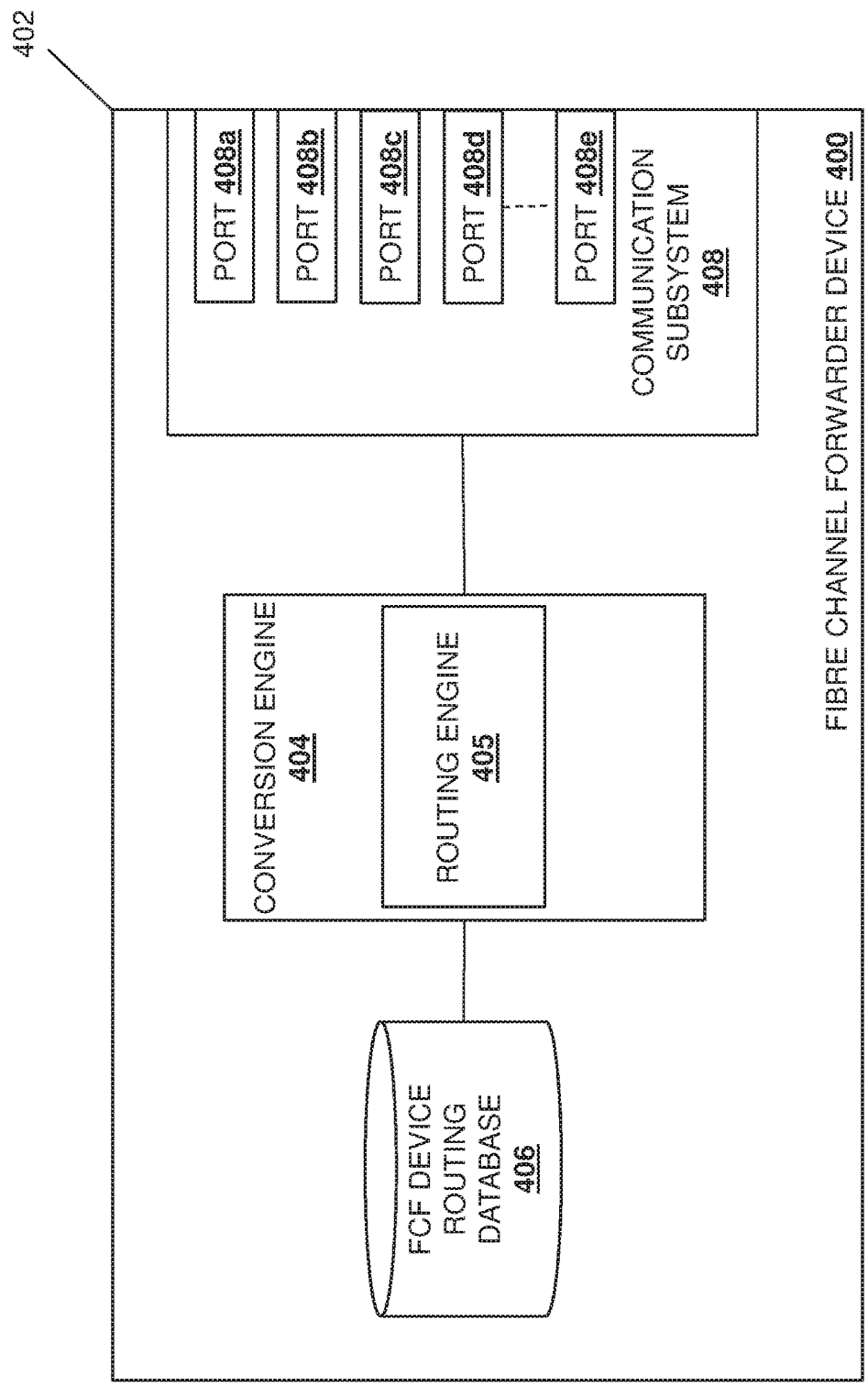
FIG. 4 is a schematic view illustrating an embodiment of an FCF device in the FCF routing system of FIG. 2.

Referring now to FIG. 4, an embodiment of a Fibre Channel Forwarder (FCF) device 400 is illustrated that may be the FCF devices 204a and 204b discussed above with reference to FIG. 2. As such, the FCF device 400 may be the IHS 100 discussed above with reference to FIG. 1 and/or may include some or all of the components of the IHS 100, and in specific examples may be a switch, a gateway, or other networking device. In the illustrated embodiment, the FCF device 400 includes a chassis 402 that houses the components of the FCF device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a conversion engine 404 that is configured to perform the functions of the conversion engines and FCF devices discussed below. In a specific example, the conversion engine 404 may include an N_Port ID Virtualization (NPIV) Proxy Gateway (NPG) engine that operates as discussed below, although other conversion engines may fall within the scope of the present disclosure as well. In another example, the conversion engine 404 may include an FCF device routing engine 405 that is configured to perform the functions of the routing engines and FCF devices discussed below such as, e.g., routing traffic between devices that are coupled to the FCF device without passing through the FC networking device, as discussed in detail below.

The chassis 402 may also house a storage system (not illustrated, but which may include the storage device 108 discussed above with reference to FIG. 1) that is coupled to the conversion engine 404 (e.g., via a coupling between the storage system and the processing system) and that may include an FCF device routing database 406 that is configured to store the data utilized as discussed below. The chassis 402 may also house a communication subsystem 408 that is coupled to the conversion engine 404 (e.g., via a coupling between the communication subsystem 408 and the processing system) and that may include a Network Interface Controller (NIC), a wireless communication devices, ports, and/or other communication components that would be apparent to one of skill in the art in possession of the present disclosure. For example, in the illustrated embodiment, the communication subsystem 408 includes a plurality of ports (e.g., the ports 408a, 408b, 408c, 408d, and up to 408e illustrated in FIG. 4) that may be coupled to an FC networking device, another FCF forwarder, and/or a server device as discussed below. Furthermore, in some embodiments, components of the conversion engine 404 and/or the communication subsystem 408 may provide an NPG that performs the functionality of the conversion engines and/or server devices discussed below. However, as discussed above, the conversion engine 404 may be utilized to provide for other types of conversions while remaining within the scope of the present disclosure. While a specific FCF device 400 has been described, one of skill in the art in possession of the present disclosure will recognize that the FCF device 400 may include a variety of other components that perform conventional FCF device functionality, as well as the functionality described below, while remaining within the scope of the present disclosure.

Figure 5B:
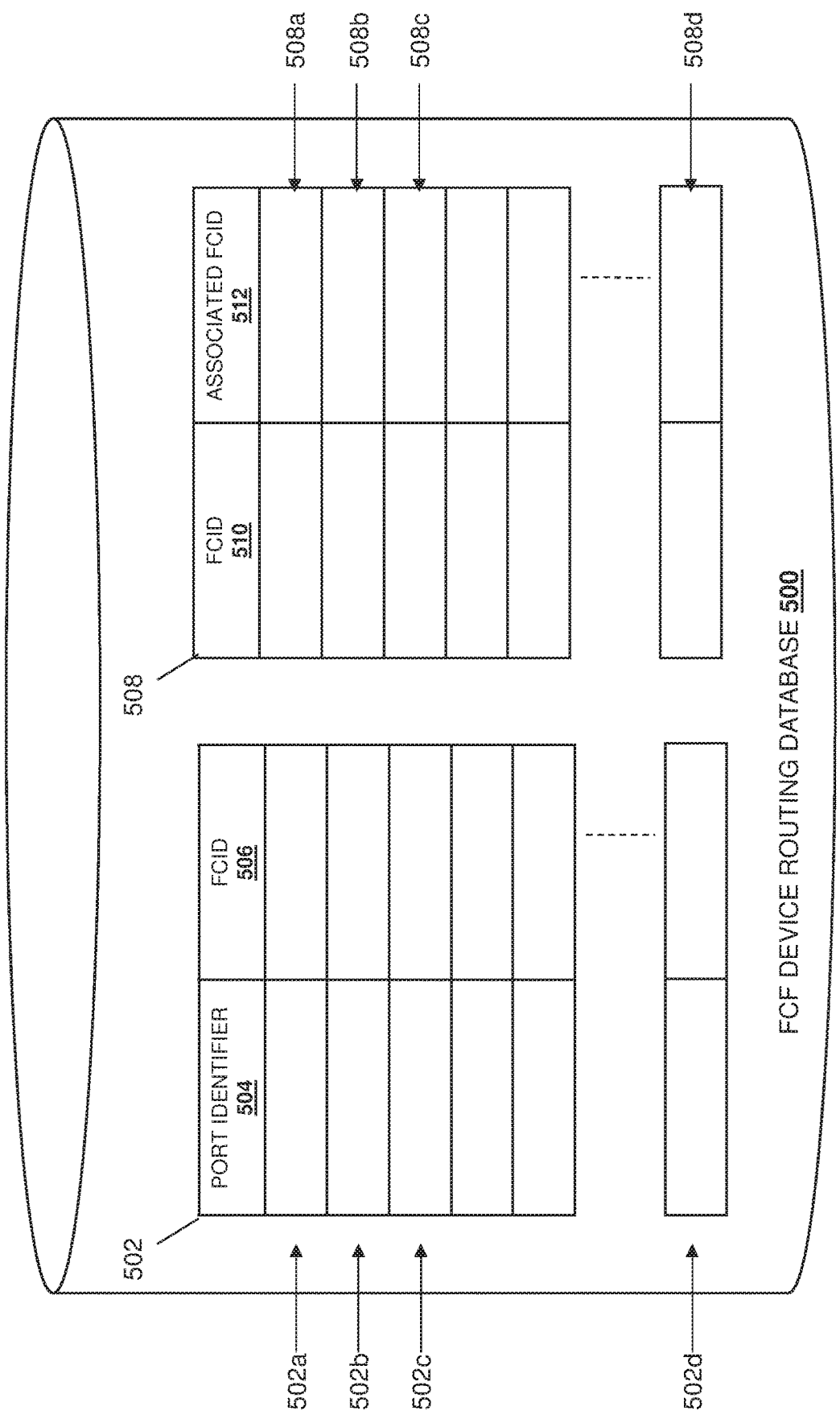
FIG. 5B is a schematic view illustrating an embodiment of an FCF device routing database in the FCF device of FIG. 2.

Referring now to FIG. 5A, an embodiment of an FCF device routing database 500 is illustrated. In an embodiment, the FCF device routing database 500 may be the FCF device routing database 406 discussed above with reference to FIG. 4. In a specific example, the FCF device routing database 500 may include an FCF device routing table 502 that may include, for example, information about ports of the FCF device 204a and devices coupled to those ports. In the illustrated example, the FCF device routing database 500 includes an FCF device routing table 502 (e.g., an enode table) having routing table entries 502a, 502b, 502c, and up to 502d. For example, for each FCF device routing table entry 502a-d, the FCF device routing table 502 may include an FCF device port identifier column 504, a Fibre Channel (FC) identifier (FCID) column 506, and/or any other information column that would be apparent to one of skill in the art to associate a port of the FCF device 204a with a device that is connected to that FCF device port. However, one of skill in the art in possession of the present disclosure will recognize that the FCF device routing database 500 and/or the FCF device routing table 502 may include and/or store other information to enable the functionality discussed below while remaining within the scope of the present disclosure. For example, with reference to FIG. 5B, the FCF device routing database 500 may include an additional FCF device routing table 508 (e.g., an enode association table) that may identify the devices connected to the FCF device 204a that are permitted to communicate with each other based on zoning, as discussed in further detail below. The FCF device routing table 508 may have routing table entries 508a, 508b, 508c, and up to 508d. For example, for each FCF device routing table entry 508a-d, the FCF device routing table 508 may include an FCID column 510 and an associated FCID column 512 that indicates FCIDs of device(s) that the device assigned the FCID in the FCID column 510 can communicate with.

Figure 6:
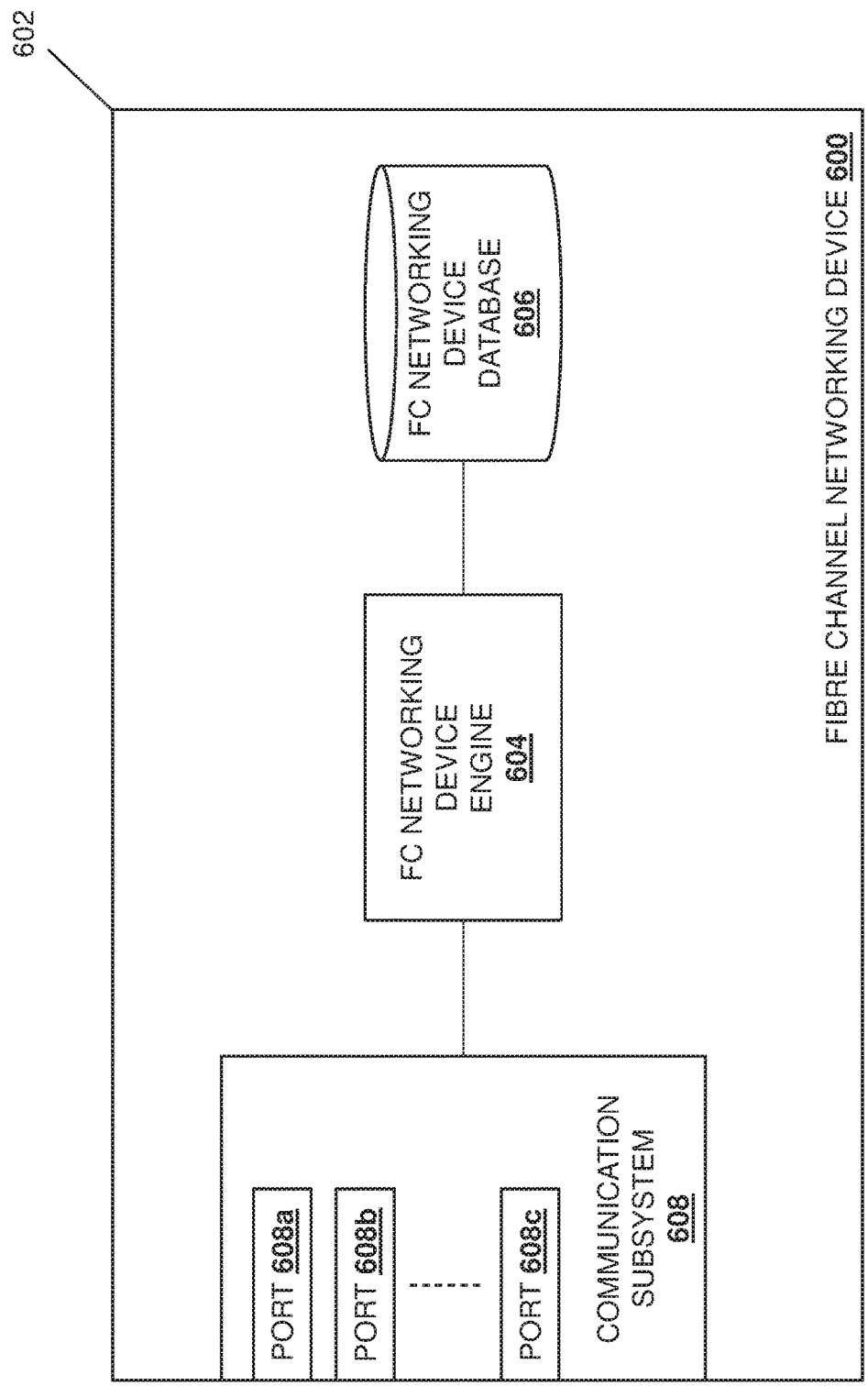
FIG. 6 is a schematic view illustrating an embodiment of a Fibre Channel (FC) networking device in the FCF routing system of FIG. 2.

Referring now to FIG. 6, an embodiment of a Fibre Channel (FC) networking device 600 is illustrated that may be the FC networking device 206 discussed above with reference to FIG. 2. As such, the FC networking device 600 may be the IHS 100 discussed above with reference to FIG. 1 and/or may include some or all of the components of the IHS 100, and in specific examples may be an FC switch. In the illustrated embodiment, the FC networking device 600 includes a chassis 602 that houses the components of the FC networking device 600, only some of which are illustrated in FIG. 6. For example, the chassis 602 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an FC networking device engine 604 that is configured to perform the functions of the FC networking device engines and FC networking devices discussed below. The chassis 602 may also house a storage system (not illustrated, but which may include the storage device 108 discussed above with reference to FIG. 1) that is coupled to the FC networking device engine 604 (e.g., via a coupling between the storage system and the processing system) and that may include an FC networking device database 606 that is configured to store the data utilized as discussed below.

The chassis 602 may also house a communication subsystem 608 that is coupled to the FC networking device engine 604 (e.g., via a coupling between the communication subsystem 608 and the processing system) and that may include a Network Interface Controller (NIC), a wireless communication devices, ports, and/or other communication components that would be apparent to one of skill in the art in possession of the present disclosure. For example, in the illustrated embodiment, the communication subsystem 608 includes a plurality of ports 608a, 608b, and up to 608c, which may be coupled to an FCF device as well as an FC SAN (e.g., the FC storage system 208), as discussed herein. While a specific FC networking device 600 has been described, one of skill in the art in possession of the present disclosure will recognize that the FC networking device 600 may include a variety of other components that perform conventional FC networking device functionality, as well as the functionality described below, while remaining within the scope of the present disclosure.

Figure 7:
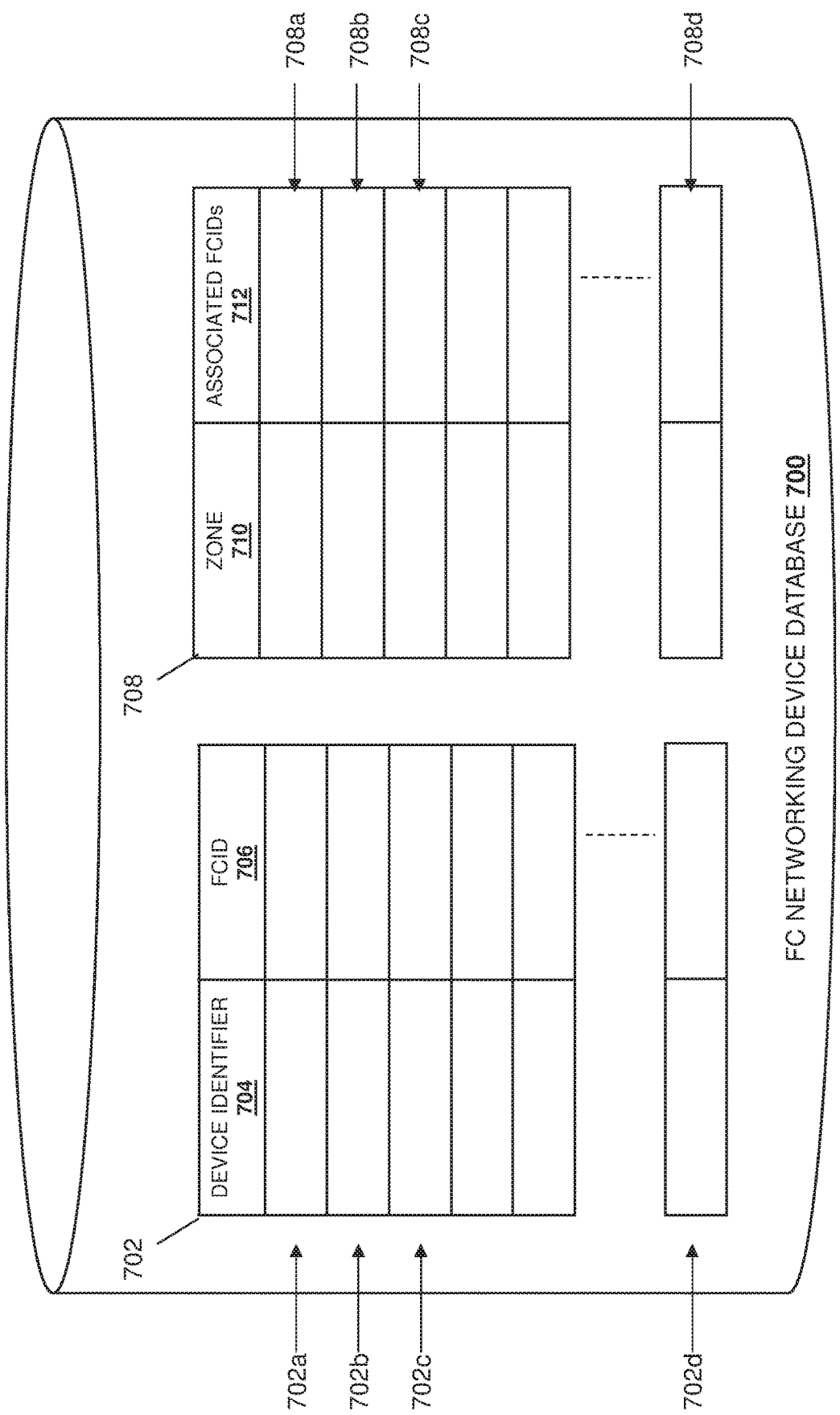
FIG. 7 is a schematic view illustrating an embodiment of an FC networking device routing database in the FC networking device of FIG. 2.

Referring now to FIG. 7, an embodiment of an FC networking device database 700 is illustrated. In an embodiment, the FC networking device database 700 may be the FC networking device database 606 discussed above with reference to FIG. 6. In the illustrated example, the FC networking device database 700 includes a Fabric Login (FLOGI) table 702 having FLOGI table entries 702a, 702b, 702c, and up to 702d. For example, for each FLOGI table entry 702a-d, the FLOGI table 702 may include a device identifier column 704 (e.g., a node worldwide name (NWWN) column), an FCID column 706, and/or other information columns that would be apparent to one of skill in the art in possession of the present disclosure such as, for example, a port identifier column (e.g., a port worldwide name (PWWN) column). In an embodiment, the FLOGI table 702 may provide the mappings of the FCIDs, provided by the FC networking device 206 during fabric login of the FCF devices 204a and 204b and the server device 202a-202c, to the PWWNs and/or the NWWNs. In various embodiments, the FC networking device database 700 may also include an active zone set table 708 having active zone set entries 708a, 708b, 708c, and up to 708d. For example, for each active zone set entry 708a-708d, the active zone set table 708 may include a zone column 710, an associated FCID column 712, and/or other information columns that would be apparent to one of skill in the art in possession of the present disclosure. The active zone set table 708 may provide the mappings of a zone to FCIDs that are associated with the zone. However, one of skill in the art in possession of the present disclosure will recognize that the FC networking device database 700, the FLOGI table 702, and/or the active zone set table 708 may include and/or store other information to enable the functionality discussed below while remaining within the scope of the present disclosure.

Figure 8:
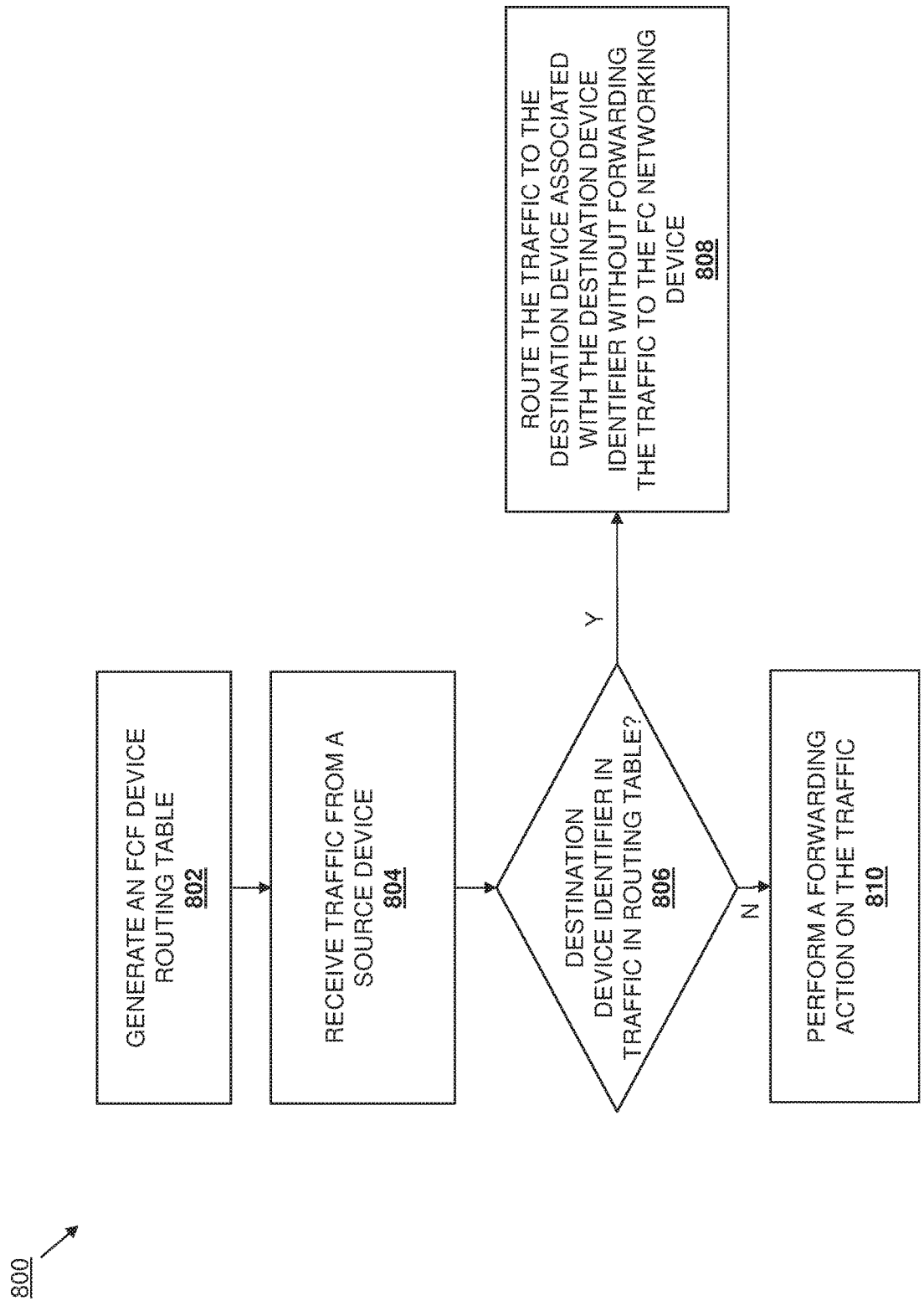
FIG. 8 is a flow chart illustrating an embodiment of a method for providing FCF device routing.

Referring now to FIG. 8, an embodiment of a method 800 for providing FCF routing is illustrated. As discussed above, conventional FCF devices forward all traffic received from source devices to an FC networking device to allow that the FC networking device to route the traffic from the source device to a destination device. However, forwarding all traffic to an FC networking device results in a number of inefficiencies that may result from, for example, "traffic tromboning". For example, if the source device and the destination device are both directly connected to the FCF device, traffic tromboning may occur when the traffic that is received at the FCF device from the source device is forwarded to the FC networking device, the FC networking device processes the traffic, and the FC networking device sends the traffic back to the FCF device for forwarding to the destination device. The systems and methods of the present disclosure provide an FCF device that routes traffic from a source device to a destination device that is connected to the FCF device without the traffic being provided to the FC networking device. Using the FCF device to route the traffic reduces the load at the FC networking device, decreases latency of the traffic being sent, alleviates congestion on the link between the FC networking device and the FCF device, and/or provides any other benefit that would be apparent to one of skill in the art in possession of the present disclosure.

The method 800 begins at block 802 where an FCF device routing table is generated. In an embodiment of block 802 and with reference to the FCF device routing database 500 of FIGS. 9A and 9B and the FC networking device database 700 of FIG. 9C, the FCF device routing engine 405 may generate one or more routing tables. For example, the FC networking device 206 may maintain a Fabric Login (FLOGI) table 702 in the FC networking device database 700 that provides the mappings of the FCIDs, provided by the FC networking device 206 during fabric login of the FCF devices 204a and 204b and the server devices 202a-202c, to the PWWNs and/or the NWWNs of those logged in devices. For example, the FLOGI table entry 702a of the FLOGI table 702 illustrates how the FC networking device engine 604 may operate to associate a first device identifier ("FCF device 204a") to a first FCID ("FCID1"). Furthermore, the FLOGI table entries 702b-702f of the FLOGI table 702 illustrates how the FC networking device engine 604 may operate to associate a second device identifier ("server 202a") to a second FCID ("FCID2"), a third device identifier ("server 202b") to a third FCID ("FCID3"), a fourth device identifier ("server 202c") to a fourth FCID ("FCID4"), a fifth device identifier ("FCF device 204b") to a fifth FCID ("FCID5"), and a sixth device identifier ("FC storage system 208") to a sixth FCID ("FCID6"), respectively.

Similarly, the FCF device routing engine 405 may maintain an FCF device routing table 502 that associates the FCIDs assigned to the devices logged into the FC SAN with the ports of the FCF device 204a. In an embodiment, the FCF device routing engine 405 may generate the FCF device routing table 502 from the FLOGI accept (ACC) and/or fabric discovery (FDISC) ACC that the FCF device 204a receives during fabric login of the connected devices 202a-202c and/or 204b. For example, and with reference to the FC device routing diagram 1000 of FIGS. 10A-10D, routing table entry 502a of the FCF device routing table 502 illustrates how the FCF device routing engine 405 may operate to associate FCID2 (assigned to the port 308a of the server device 202a) to a first port identifier ("port 408b") of the port 408b of the FCF device 204a that is coupled to the port 308a of the server device 202a. Furthermore, routing table entry 502b illustrates how the FCF device routing engine 405 may operate to associate FCID3 (assigned to a port 308b of the server device 202b) to a second port identifier ("port 408c") of the port 408c that is coupled to port 308b of the server device 202b. Routing table entry 502c of the FCF device routing table 502 illustrates how the FCF device routing engine 405 may operate to associate FCID4 (assigned to a port 308c of the server device 202c) to a third port identifier ("port 408d") of the port 408d that is coupled to port 308c of the server device 202c. Row 502d of the FCF device routing table 502 illustrates how the FCF device routing engine 405 may operate to associate FCID5 (assigned to a port 408f of the FCF device 204b) to a fourth port identifier ("port 408e") of the port 408e that is coupled to port 408f of the FCF device 204b.

In various embodiments, the FCF device routing engine 405 may generate the FCF device routing table 508. The FCF device routing engine 405 may snoop communications from the FC networking device 206 provided through the FCF device 204a that provide active zone sets from the active zone set table 708 of the FC networking device 206. For example, active zone set entry 708a of the active zone set table 708 illustrates how the FC networking device engine 604 may operate to associate FCID2 and FCID3 to a first zone ("zone1"). Active zone set entry 708b of the active zone set table 708 illustrates how the FC networking device engine 604 may operate to associate FCID2 and FCID4 to a second zone ("zone2"). Active zone set entry 708c of the active zone set table 708 illustrates how the FC networking device engine 604 may operate to associate FCID2 and FCID6 to a third zone ("zone3"). In the illustrated example FCID5 is not assigned to a zone. However, in various examples discussed below, FCID5 may be assigned to a fourth zone that includes another FCID other than FCID2. The devices, associated in each zone by their FCIDs, are permitted to communicate with each other. In a specific example, the FCF device routing engine 405 may snoop accept common transport information units (CT_IU) in response to a get port identifier port type (GID_PT) request to obtain list of devices to which a particular end device can communicate.

Figure 9B:
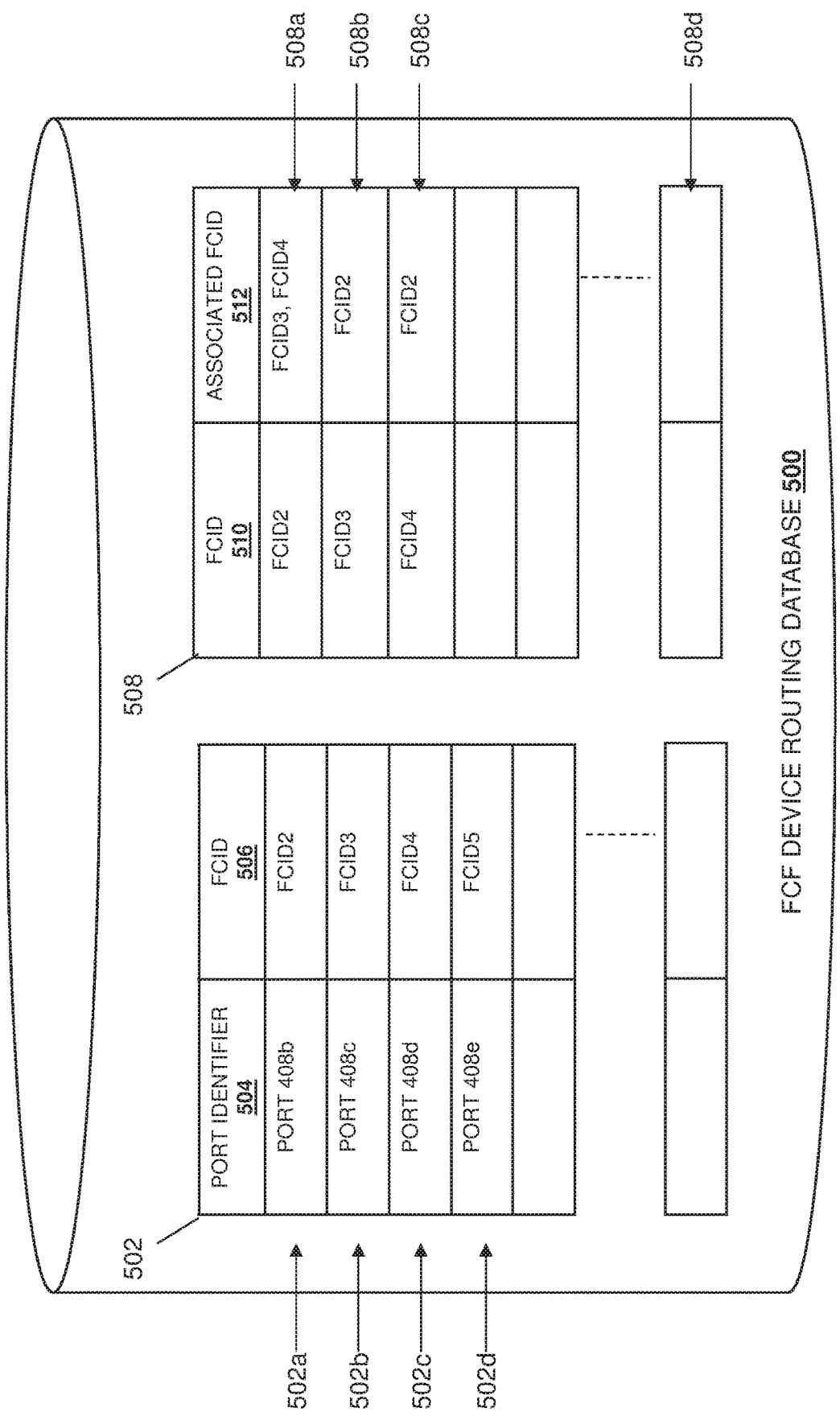
FIG. 9B is a schematic view illustrating an embodiment of information being provided in the FCF device routing database of FIG. 5B during the method of FIG. 8.
Figure 9C:
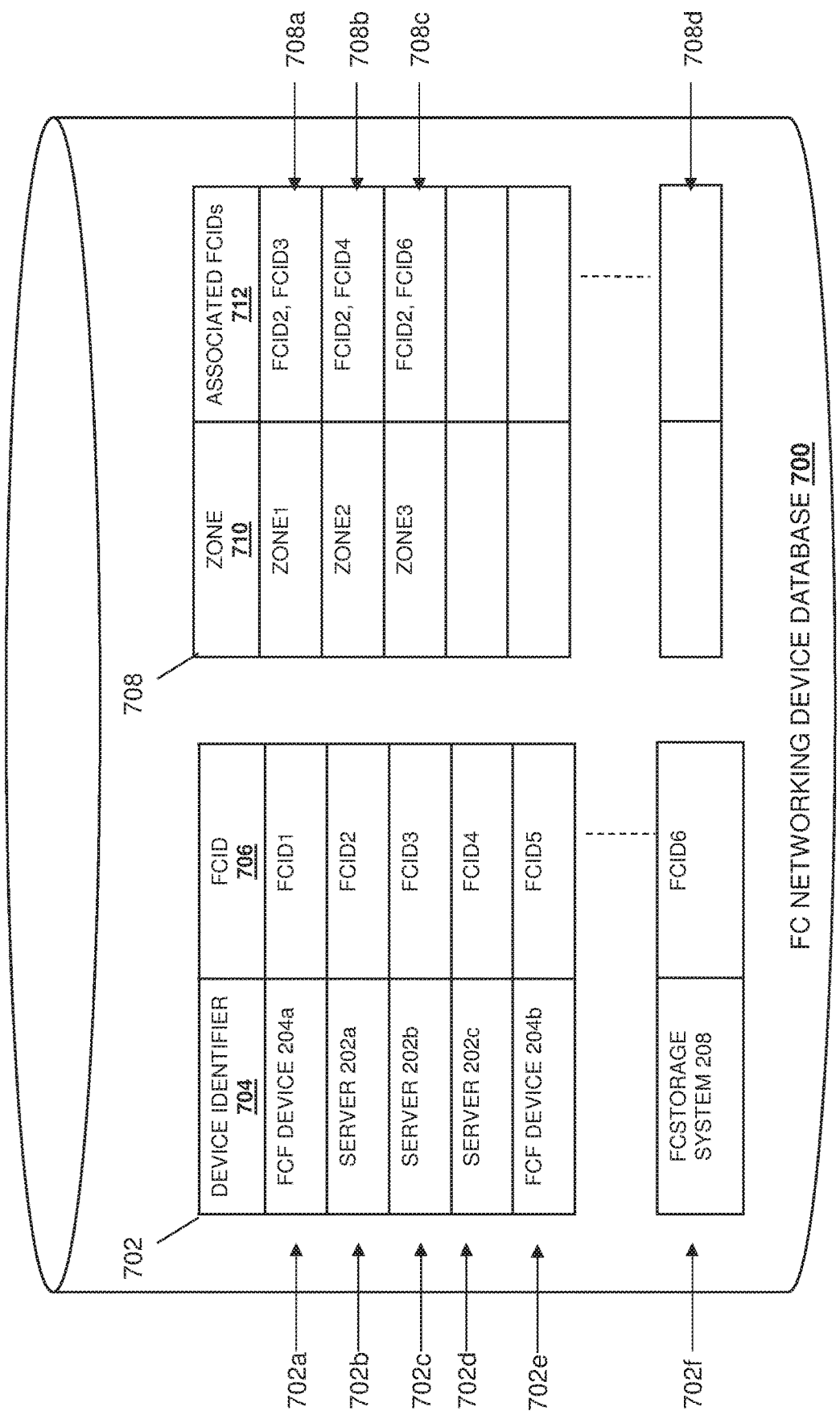
FIG. 9C is a schematic view illustrating an embodiment of information being provided in the FC networking device port grouping database of FIG. 7 during the method of FIG. 8.

As such, by snooping communications from the FC networking device 206 that provide the active zone sets of the active zone set table 708, the FCF device routing engine 405 may generate the FCF device routing table 508, which may include routing table entries 508a-508c, each of which may identify all of the directly connected devices (e.g., the server devices 202a-202c and/or the FCF device 204b) to which a particular one of those directly connected is permitted to communicate. For example, routing table entry 508a of the FCF device routing table 508 in FIG. 9B illustrates how the FCF device routing engine 405 establishes that the server device 202a that is assigned FCID2 is permitted to communicate with the server device 202b that is assigned FCID3 and the server device 202c that is assigned FCID4. Similarly, routing table entry 508b of the FCF device routing table 508 in FIG. 9B illustrates how the FCF device routing engine 405 establishes that the server device 202b that is assigned FCID3 is permitted to communicate with the server device 202a that is assigned FCID2. Furthermore, routing table entry 508c of the FCF device routing table 508 in FIG. 9B illustrates how the FCF device routing engine 405 establishes that the server device 202c that is assigned FCID4 is permitted to communicate with the server device 202a that is assigned FCID2.

The method 800 then proceeds to block 804 where first traffic is received from a source device at a first FCF device port that is coupled to the source device. In an embodiment of block 804, the source device may be any of the devices (e.g., the server devices 202a-202c or the FCF device 204b) that are directly connected to the FCF device 204a and that provide traffic to that FCF device 204a that is addressed to a destination device, which may be any of the devices in the FC SAN (e.g., the server device 202a-202c, the FCF device 204b, or the FC storage system 208). However, in other embodiments the source device may a device that is connected to the FCF device 204a through an intermediary device. For example, the source device may be a server device that is directly connected to the FCF device 204b that is directly connected to the FCF device 204a.

The traffic may include a source device identifier (e.g., an FCID of the source device) and a destination device identifier (e.g., an FCID of the destination device). For example and with reference to a FCF routing diagrams 1000a, 1000b, 1000c, and 1000d in FIGS. 10A, 10B, 100, and 10D, respectively, the source device may be the server device 202a. In the FCF routing diagrams 1000a-1000d, the server device 202a may provide traffic to the FCF device 204a. In the example provided by the FCF routing diagram 1000a of FIG. 10A and as illustrated by the traffic route 1002a, the destination device of the traffic may be the server device 202b. In the example provided by the FCF routing diagram 1000b of FIG. 10B and as illustrated by a traffic route 1002b, the destination device of the traffic may be the FC storage system 208. In the example provided by the FCF routing diagrams 1000c of FIG. 100 and as illustrated by a traffic route 1002c, the destination device of the traffic may be the FCF device 204b. In the example provided by the FCF routing diagram 1000d of FIG. 10D, the destination device of the traffic provided on a traffic route 1002d may be the FCF device 204b.

The method 800 then proceeds to decision block 806 where it is determined, using a first FCF device routing table, whether a destination device identifier included in the first traffic corresponds with a first destination device. In an embodiment of decision block 806 and with reference to the FCF device routing database 500 of FIGS. 9A and 9B, the FCF device routing engine 405 may use the FCF device routing table 502 to determine whether the traffic being received at an F_Port (e.g., port 408b-408e) of the FCF device 204a includes a destination identifier that is provided in the FCF device routing table 502. For example, the FCF device routing engine 405 may determine whether the traffic includes a destination identifier of FCID2, FCID3, FCID4, or FCID5 from the FCF device routing table 502. In another embodiment, the FCF device routing engine 405 may use the FCF device routing table 508 to determine whether the traffic is addressed to a destination device with which the source device is permitted to communicate. For example, the FCF device routing engine 405 may determine whether the source identifier included in the traffic is provided in the FCID column 510 and, if so, determine whether the destination identifier include in the traffic is provided in the associated FCID column 512. Thus, according to FCF device routing table 508, traffic received from a source device that is assigned FCID2 can only be routed to destination devices that are assigned FCID3 and FCID4, traffic received from a source device that is assigned FCID 3 can only be routed to a destination device that is assigned FCID2, and traffic received from a source device that is assigned FCID4 may only be routed to a destination device that is assigned FCID2.

If, at decision block 806, it is determined that the destination device identifier included in the first traffic corresponds with a destination device identifier in the FCF device routing table, then the method 800 proceeds to block 808 where the first traffic is routed to the destination device associated with the destination device identifier without forwarding the traffic to the FC networking device. In an embodiment of block 808, the FCF device routing engine 405 may route the traffic received at an FCF device F_Port connected to the source device to an FCF device F_Port that is directly or indirectly connected to the destination device. The FCF device 204*a* may provide the traffic to the destination device without the traffic first being forwarded to the FC networking device 206 as is done in conventional FCF devices.

Figure 10A:
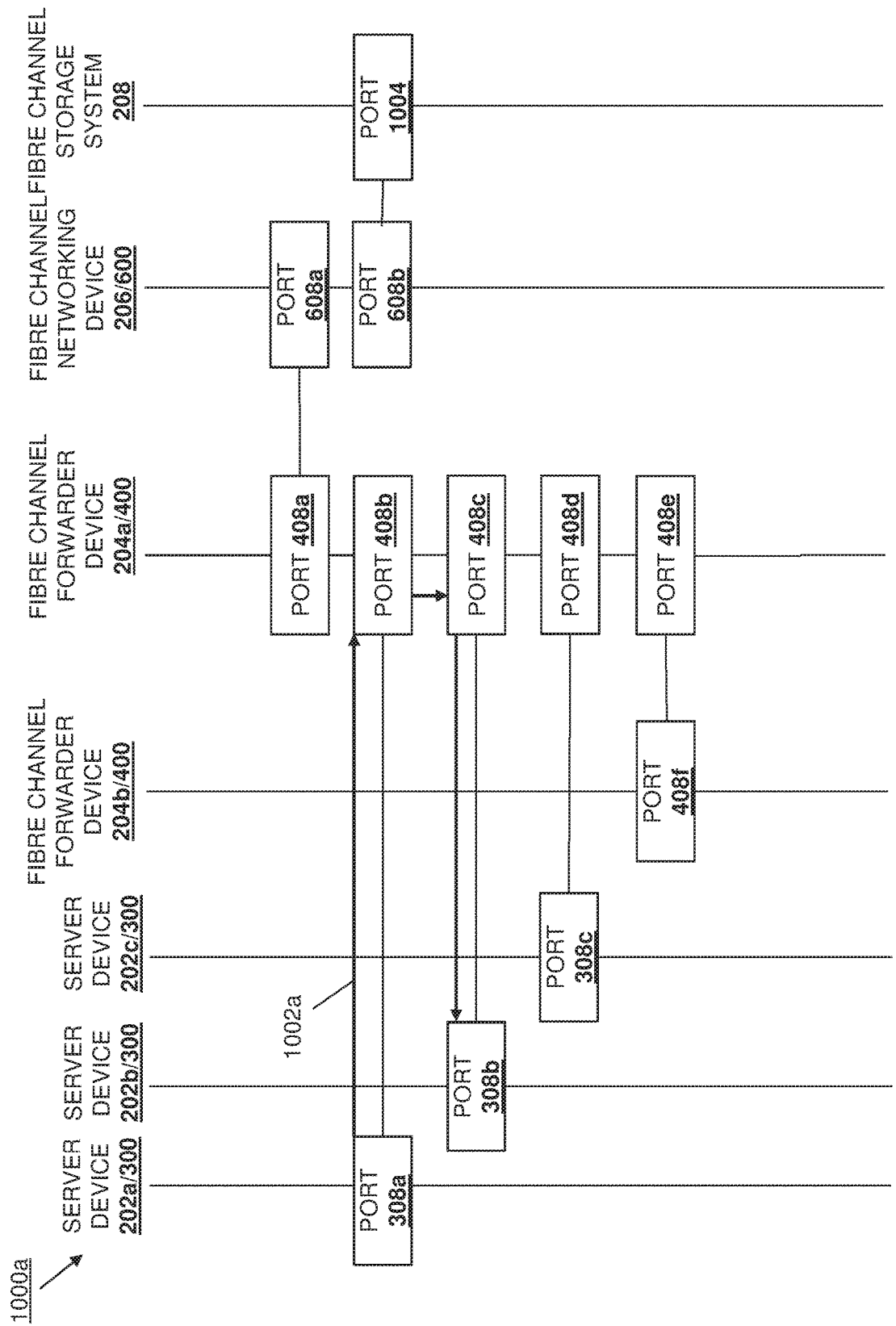
FIG. 10A is a diagram illustrating an embodiment of the FCF device routing during the method of FIG. 8.
Figure 10B:
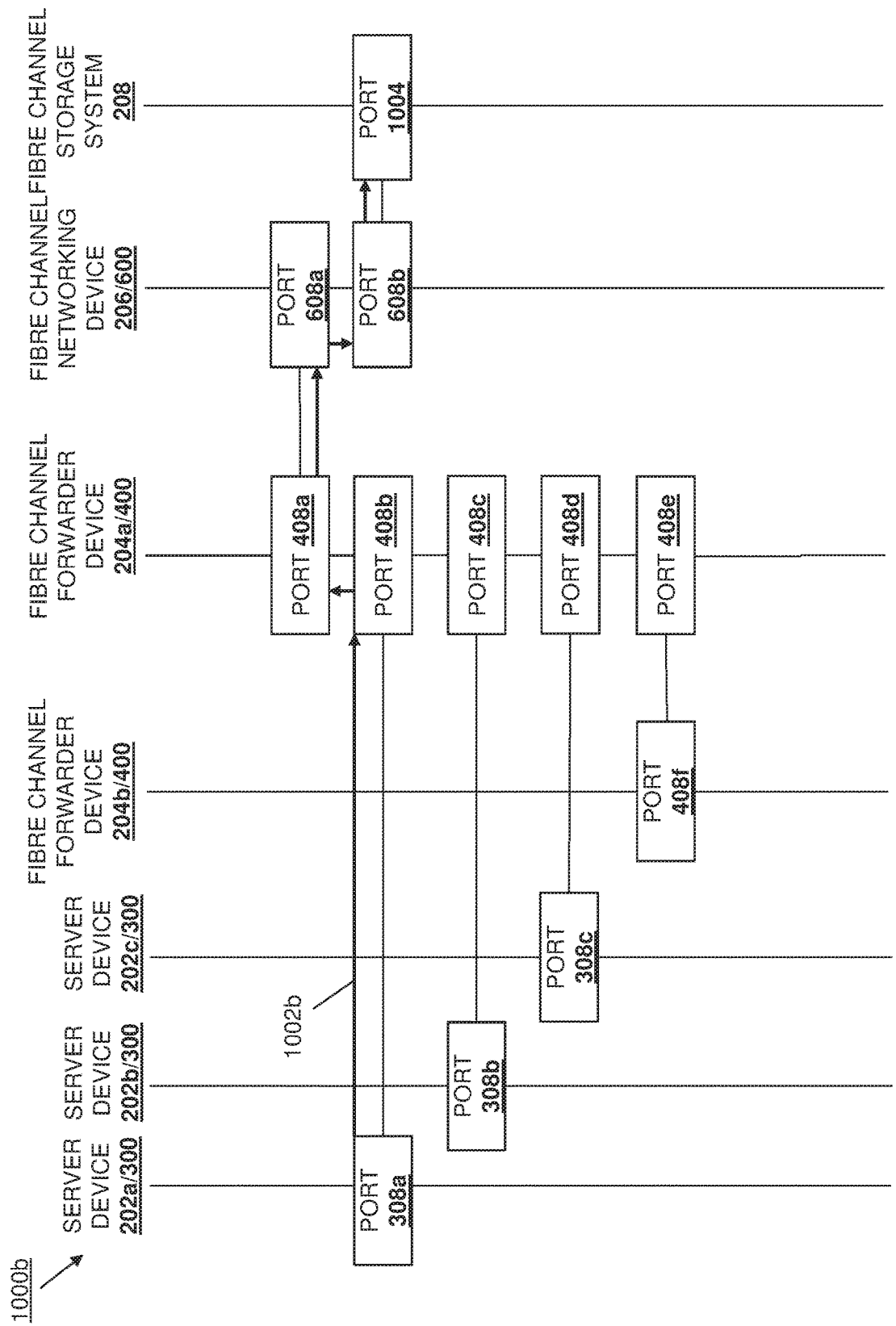
FIG. 10B is a diagram illustrating an embodiment of the FCF device routing during the method of FIG. 8.

For example and with reference to the FCF device routing database 500 of FIG. 9B and the FCF routing diagram 1000*a* of FIG. 10A, the FCF device 204*a* may receive traffic at port 408*b* from port 308*a* of the server device 202*a* and determine that the destination device identifier (e.g., FCID3) included in the traffic corresponds to FCID3 that is provided in the FCF device routing table 502. The FCF device routing engine 405 may route the traffic to the port 408*c* of the FCF device 204*a* and provide that traffic to the port 308*b* of the server device 202*b*, which is assigned the FCID of FCID3. In another example, the FCF device routing engine 405 may receive traffic at port 408*b* from port 308*a* of the server device 202*a* and determine that the destination device identifier (e.g., FCID3) included in the traffic corresponds to FCID3 that is provided in the FCF device routing table 508 as a permitted destination device for traffic being provided by the source device assigned the FCID of FCID2. The FCF device routing engine 405 may route the traffic to the port 408*c* of the FCF device 204*a* and provide that traffic to the port 308*b* of the server device 202*b*, which is assigned the FCID of FCID3.

Figure 10C:
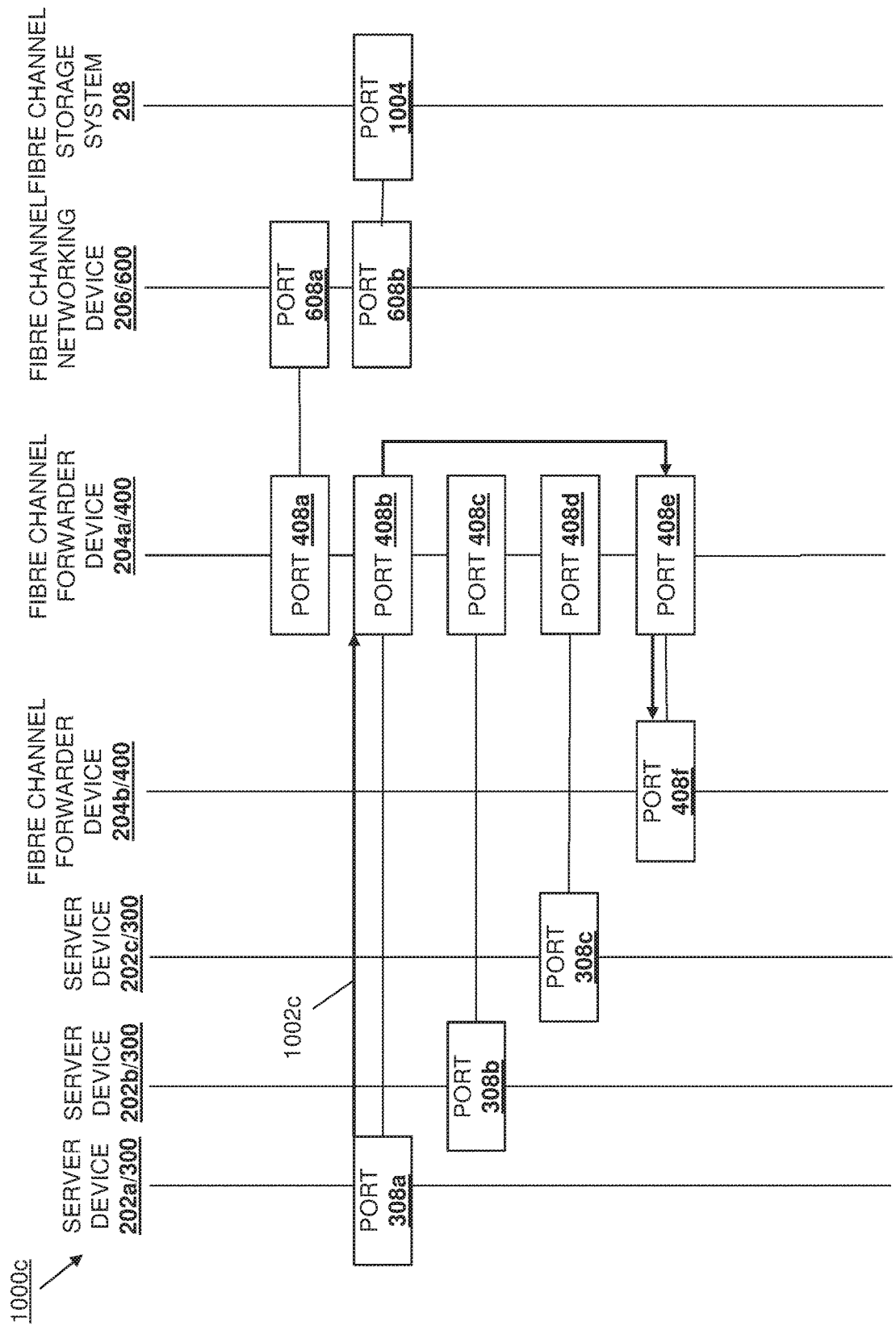
FIG. 10C is a diagram illustrating an embodiment of the FCF device routing during the method of FIG. 8.

In yet another example and with reference to the FCF device routing database 500 of FIG. 9B and the FCF routing diagram 1000*c* of FIG. 10*c*, the FCF device 204*a* may receive traffic at port 408*b* from port 308*a* of the server device 202*a* and determine that the destination device identifier (e.g., FCID5) included in the traffic corresponds to FCID5 that is provided in the FCF device routing table 502. The FCF device routing engine 405 may route the traffic to the port 408*e* of the FCF device 204*a* and provide that traffic to a port 408*f* of the FCF device 204*b*, which is assigned the FCID of FCID5.

If, at decision block 806, it is determined that the destination device identifier included in the first traffic does not correspond with a destination device identifier in the FCF device routing table, then the method 800 proceeds to block 810 where a forwarding action is performed on the traffic. In an embodiment of block 810, the FCF device routing engine 405 may perform a forwarding action on the traffic in response to the destination device identifier included in the traffic not corresponding with a destination device identifier in the FCF device routing database 406. In various embodiments, the forwarding action may include the FCF device routing engine 405 forwarding the traffic to the FC networking device 206. For example and with reference to the FCF device routing database 500 of FIG. 9B and the FCF routing diagram 1000*b* of FIG. 10B, the FCF device 204*a* may receive traffic at port 408*b* from port 308*a* of the server device 202*a* and determine that the destination device identifier (e.g., FCID6) included in the traffic does not correspond to any of the FCIDs that are provided in the FCF device routing table 502. The FCF device routing engine 405 may forward the traffic to the port 408*a* of the FCF device 204*a* and provide that traffic to the port 602*a* of the FC networking device 206. The FC networking device engine 604 may route the traffic to a port 1004 of the FC storage system 208, which is assigned the FCID of FCID6.

Similarly, the FCF device 204*a* may receive traffic at port 408*b* from port 308*a* of the server device 202*a* and determine that the destination device identifier (e.g., FCID6) included in the traffic does not correspond to any of the FCIDs in the associated FCID column 512 that are provided in the FCF device routing table 508. The FCF device routing engine 405 may then reference the FCF device routing table 502 to determine whether FCID6 corresponds to any of the FCIDs in the FCF device routing table 502. If FCID6 does not correspond with the FCIDs of the destination devices in the FCF device routing table 508 and the FCF device routing table 502, then the FCF device routing engine 405 may forward the traffic to the port 408*a* of the FCF device 204*a* and provide that traffic to the port 602*a* of the FC networking device 206. The FC networking device engine 604 may route the traffic to a port 1004 of the FC storage system 208, which is assigned the FCID of FCID6.

In various embodiments, the forwarding action may include the FCF device routing engine 405 dropping the traffic. For example and with reference to the FCF device routing database 500 of FIG. 9B and the FCF routing diagram 1000*d* of FIG. 10D, the FCF device 204*a* may receive traffic at the port 408*b* from the port 308*a* of the server device 202*a* and determine that the destination device identifier (e.g., FCID5) included in the traffic does not correspond with any of the FCIDs in the associated FCID column 512 that are provided in the FCF device routing table 508. The FCF device routing engine 405 may then reference the FCF device routing table 502 to determine whether FCID5 is included as one of the FCIDs provided in the FCF device routing table 502. Because FCID5 does not correspond with the FCIDs of the destination devices in the FCF device routing table 508 and FCID5 does correspond to an FCID provided in the FCF device routing table 502, the FCF device routing engine 405 may determine that the server device 202*a* is not permitted to provide traffic to the FCF device 204*b*. For example and with reference to the FC networking device database 700, the FCID5 is not provided in any of the zones of the active zone set table 708. Thus, the FCF device may make a determination as to whether to route traffic based on zones without the use of the FC networking device 206. In response to determining that the server device 202*a* is not permitted to provide traffic to the FCF device 204*a*, then the FCF device routing engine 405 may drop the traffic instead of routing the traffic to the port 408e to provide the traffic to the port 408f of the FCF device 204b.

Thus, systems and methods have been described that provide for FCF device traffic routing such that an FCF device routes traffic addressed to a device directly connected to the FCF device without providing that traffic first to an FC networking device. The FCF device may reference FCF device routing tables in determining whether to route the traffic to devices directly connected to the FCF device, provide the traffic to the FC networking device, or drop the traffic according to active zoning of the devices connected to the FC SAN. The systems and methods eliminate traffic tromboning between the FCF device and FC networking device, which occurs in conventional FC SANs. Thus, the systems and methods reduce the latency on traffic, free bandwidth on the links between the FCF device and the FC networking device, relieve congestion of on those links, and reduce processing loads on the FCF device and the FC networking device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel Forwarder (FCF) routing system, comprising:
 a Fibre Channel (FC) networking device;
 a source device;
 a first destination device; and
 an FCF device that is coupled to the FC networking device through a first FCF device port, coupled to the source device through a second FCF device port, coupled to the first destination device through a third FCF device port; and logged in to an FC network via a fabric login established with the FC networking device, wherein the FCF device is configured to:
  receive first traffic from the source device at the second FCF device port;
  determine, using a first FCF device routing table that bypasses default traffic forwarding to the FC networking device that established the fabric login with the FCF device, that a destination device identifier included in the first traffic corresponds with the first destination device; and
  route, in response to determining that the destination device identifier included in the first traffic corresponds with the first destination device, the first traffic through the third FCF device port to the first destination device without forwarding the first traffic through the first FCF device port to the FC networking device.

2. The FCF routing system of claim 1, wherein the FCF device is further configured to:
 receive second traffic from the source device at the second FCF device port;
 determine, using the first FCF device routing table, that a destination device identifier included in the second traffic does not correspond with the first destination device; and
 forward, in response to determining the destination device identifier included in the second traffic does not correspond with the first destination device, the second traffic through the first FCF device port to the FC networking device that established the fabric login with the FCF device.

3. The FCF routing system of claim 1, wherein the FCF device is further configured to:
 receive second traffic from the source device at the second FCF device port;
 determine, using the first FCF device routing table and a second FCF device routing table, that a destination device identifier included in the second traffic does not correspond with the first destination device; and
 forward, in response to determining the destination device identifier included in the second traffic does not correspond with the first destination device, the first traffic through the first FCF device port to the FC networking device that established the fabric login with the FCF device.

4. The FCF routing system of claim 1, wherein the FCF device is further configured to:
 receive second traffic from the source device at the second FCF device port;
 determine, using the first FCF device routing table, that a destination device identifier included in the second traffic does not correspond with the first destination device;
 determine, using a second FCF device routing table, that the destination device identifier included in the second traffic corresponds with the first destination device; and
 drop, in response to determining the destination device identifier included in the second traffic corresponds with the first destination device based on the second FCF device routing table, the second traffic.

5. The FCF routing system of claim 1, wherein the first FCF device routing table includes an association of the source device with the first destination device to which the source device is permitted to provide traffic.

6. The FCF routing system of claim 5, wherein the FCF device is further configured to:
 snoop an accept Common Transport Information Unit (CT_IU) to a Get Port Identifier Port Type (GID_PT) request from the FC networking device for directly connected devices that are directly connected to the FCF device, wherein the directly connected devices include the first destination device and the source device; and
 generate, based on the snooping, the first FCF device routing table that includes the association of the source device with the first destination device to which the source device is permitted to provide traffic.

7. The FCF routing system of claim 1, wherein the first FCF device routing table includes an association of the third FCF device port to a first destination device identifier of the first destination device.

8. An Information Handling System (IHS), comprising:
 a plurality of ports;
 a processing system that is coupled to the plurality of ports; and
 a memory system that is coupled to the processing system and that includes instructions that, when executed by the processing system, cause the processing system to provide an N_Port ID Virtualization (NPIV) Proxy Gateway (NPG) engine that is configured to:
  receive first traffic from a source device that is connected to a first port of the plurality of ports;
  determine, using a first Fibre Channel Forwarder (FCF) device routing table that was at least partially generated by snooping communications that provide active zone sets from a Fibre Channel (FC) networking device that is coupled to a second port included in the plurality of ports, that a destination device identifier included in the first traffic corresponds with a first destination device; and route, in response determining the destination device identifier included in the first traffic corresponds with the first destination device, the first traffic through a third port of the plurality of ports to the first destination device without forwarding the first traffic through the second port to the FC networking device.

9. The IHS of claim 8, wherein the NPG engine is further configured to:

receive second traffic from the source device at the first port;

determine, using the first FCF device routing table, that a destination device identifier included in the second traffic does not correspond with the first destination device; and forward, in response to determining the destination device identifier included in the second traffic does not correspond with the first destination device, the second traffic through the second port to the FC networking device.

10. The IHS of claim 8, wherein the NPG engine is further configured to:

receive second traffic from the source device at the first port;

determine, using the first FCF device routing table and a second FCF device routing table, that a destination device identifier included in the second traffic does not correspond with the first destination device; and forward, in response to determining the destination device identifier included in the second traffic does not correspond with the first destination device, the first traffic through the second port to the FC networking device.

11. The IHS of claim 8, wherein the NPG engine is further configured to:

receive second traffic from the source device at the first port;

determine, using the first FCF device routing table, that a destination device identifier included in the second traffic does not correspond with the first destination device;

determine, using a second FCF device routing table, that the destination device identifier included in the second traffic corresponds with the first destination device; and drop, in response to determining the destination device identifier included in the second traffic corresponds with the first destination device based on the second FCF device routing table, the second traffic.

12. The IHS of claim 8, wherein the first FCF device routing table includes an association of the source device with the first destination device to which the source device is permitted to provide traffic.

13. The IHS of claim 8, wherein the snooping of communications that provide active zone sets from FC networking device to at least partially generate the first FCF device routing table includes:

snooping an accept Common Transport Information Unit (CT_IU) to a Get Port Identifier Port Type (GID_PT) request from the FC networking device for directly connected devices that are directly connected to the FCF device, wherein the directly connected devices include the first destination device and the source device; and generating, based on the snooping, the first FCF device routing table that includes an association of the source device with the first destination device to which the source device is permitted to provide traffic.

14. The IHS of claim 8, wherein the first FCF device routing table includes an association of the third port to a first destination device identifier of the first destination device.

15. A method of Fibre Channel Forwarder (FCF) device routing, comprising:

receiving, by an FCF device, first traffic from a source device that is connected to a first FCF device port;

determining, by the FCF device and using a first Fibre Channel Forwarder (FCF) device routing table that bypasses default traffic forwarding to a Fibre Channel (FC) networking device that is connected to a second port that is included in the plurality of ports and that established a fabric login to an FC network with the FCF device, that a destination device identifier included in the first traffic corresponds with a first destination device; and routing, by the FCF device and in response determining the destination device identifier included in the first traffic corresponds with the first destination device, the first traffic through a third FCF device port to the first destination device without forwarding the first traffic through the second FCF device port to the FC networking device.

16. The method of claim 15, further comprising:

receiving, by the FCF device, second traffic from the source device at the first FCF device port;

determining, by the FCF device and using the first FCF device routing table, that a destination device identifier included in the second traffic does not correspond with the first destination device; and forwarding, by the FCF device and in response to determining the destination device identifier included in the second traffic does not correspond with the first destination device, the second traffic through the second FCF device port to the FC networking device that established the fabric login with the FCF device.

17. The method of claim 15, further comprising:

receiving, by the FCF device, second traffic from the source device at the first FCF device port;

determining, by the FCF device and using the first FCF device routing table and a second FCF device routing table, that a destination device identifier included in the second traffic does not correspond with the first destination device; and forwarding, by the FCF device and in response to determining the destination device identifier included in the second traffic does not correspond with the first destination device, the first traffic through the second FCF device port to the FC networking device that established the fabric login with the FCF device.

18. The method of claim 15, further comprising:

receiving, by the FCF device, second traffic from the source device at the first device port;

determining, by the FCF device and using the first FCF device routing table, that a destination device identifier included in the second traffic does not correspond with the first destination device;

determining, by the FCF device and using a second FCF device routing table, that the destination device identifier included in the second traffic corresponds with the first destination device; and dropping, by the FCF device and in response to determining the destination device identifier included in the second traffic corresponds with the first destination device based on the second FCF device routing table, the second traffic.

19. The method of claim 15, wherein the first FCF device routing table includes an association of the source device with the first destination device to which the source device is permitted to provide traffic.

20. The method of claim 19, further comprising:
snooping, by the FCF device, an accept Common Transport Information Unit (CT_IU) to a Get Port Identifier Port Type (GID_PT) request from the FC networking device for directly connected devices that are directly connected to the FCF device, wherein the directly connected devices include the first destination device and the source device; and
generating, by the FCF device and based on the snooping, the first FCF device routing table that includes the association of the source device with the first destination device to which the source device is permitted to provide traffic.

\* \* \* \* \*